3,345,347
PRODUCTION OF ELASTOMERS BY VULCANIZATION OF POLYALKYLENE OXIDES
Gunther Elfers, Grosse Ile, and Sidney L. Reegen, Oak Park, Mich., assignors to Wyandotte Chemicals Corporation, Wyandotte, Mich., a corporation of Michigan
No Drawing. Filed Nov. 9, 1964, Ser. No. 409,982
24 Claims. (Cl. 260—79.5)

The present invention relates to the production of elastomers, and is more particularly concerned with the production of elastomers by the vulcanization of polyalkylene oxides.

Alkylene oxides have been utilized in the prior art for the production of elastomers. In some cases, the alkylene oxides have been reacted with polyphenolic materials to form epoxy resin elastomers. In other cases, they have been reacted to form polyurethane types of elastomers. However, efforts to provide a suitable elastomer by the vulcanization of the polyalkylene oxide itself have been generally unsuccessful. Since double bonds are not present in these compounds or their polymeric reaction products, usual cross-linking procedures and practices are inapplicable.

It is an object of the present invention to provide an elastomer having certain desirable properties by the vulcanization of a composition comprising a polyalkylene oxide. It is a further object to provide such an elastomer having properties which are generally desirable for commercial applications for which elastomers are commonly used, as for example, rubber tires, belts, hoses, and footwear. It is still a further object to provide such elastomers which may be relatively inexpensively produced. It is a further object to provide a process for the production of elastomers of the type described. Additional objects will be apparent to one skilled in the art and still others will become apparent hereinafter.

According to the invention, an alkylene oxide or a mixture of alkylene oxides having from two to twelve carbon atoms, inclusive, and free of other than aromatic unsaturation, is polymerized by a suitable method to produce a high molecular weight polymer or copolymer. The polymer or copolymer thus produced is then cross-linked with a sulfur-containing vulcanizing agent and a free radical vulcanizing agent or catalyst such as dicumylperoxide. Other materials such as fillers, reinforcing materials, and extenders commonly used in the art such as zinc oxide, stearic acid, and carbon black, may also be incorporated. When the composition is cured at the proper temperature and for the proper time, a strong elastomer results having many commercially desirable properties.

ALKYLENE OXIDE (FREE OF OTHER THAN AROMATIC UNSATURATION)

The present process is particularly well suited to produce elastomers from high molecular weight polymers of alkylene oxides having from two to four carbon atoms, as for example ethylene oxide, 1,2-propylene oxide and 1,2-butylene oxide. However, the present process may also be utilized with polymers of alkylene oxides having from two to twelve carbon atoms. In addition to those listed above, polymers and copolymers of other alkylene oxides may be used, such as isobutylene oxide, 2,3-butylene oxide, 1,2-pentylene oxide, 2,3-hexylene oxide, 3,4-hexylene oxide, 3-ethyl-2,3-pentylene oxide, 1,2-dodecylene oxide, cyclopentene oxide, cyclohexene oxide, camphene oxide, styrene oxide, benzylethylene oxide, and similar materials free of other than aromatic unsaturation. Additionally, mixtures of two or more different alkylene oxides may be used.

Any suitable catalyst or catalyst system useful for the preparation of polyalkylene oxides may be used. A suitable catalyst composition for the preparation of polymers with $\overline{M}_v$ ranging from about 20,000 to 1,300,000 and particularly isotactic polymers, is zinc-di-n-butyl/aluminum triisopropoxide/$H_2O$ at a 1:1:1 mole ratio (0.5 mole percent zinc based on monomer). For polymers having $\overline{M}_v$ as high as 5,400,000 or greater, a catalyst composition with a $Zn/Al/H_2O=1.5:1:0.5$ ratio (0.75 mole percent zinc based on monomer) may be used to obtain yields in the range of about 94 percent to about 100 percent. Additionally, polyalkylene oxide polymers having the same or different molecular weights may be obtained by conventional procedures.

The polyalkylene oxide utilized in the present invention should have a molecular weight (based on intrinsic viscosity measurements) before compounding and/or milling of about 100,000 to about 20,000,000, and preferably in the range of about 1,000,000 to about 10,000,000. When polymers of molecular weight lower than 1,000,000 are used, the resulting tensile strength of the cured elastomer may not be sufficient for some purposes, and even the use of a reinforcing filler such as carbon black may not sufficiently improve the tensile strength of the finally cured polymer. Consequently, it is preferred that polymers having a molecular weight greater than 1,000,000 be used. The polyalkylene oxide may, if desired, be compounded with a stabilizer immediately after the polymerization process. Among the stabilizers which may be used are those of the amine type, e.g., phenyl beta-naphthylamine, or phenol-type, as for example hydroquinone monobenzyl ether. The stabilizer may be employed in any suitable range, as for example about 0.1 to about two percent.

CROSS-LINKING OR VULCANIZING AGENTS (FREE RADICAL CATALYST TYPE)

Suitable peroxides for cross-linking the polyalkylene oxides are generally diperoxides, hydroperoxides, and hydrogen peroxide. Suitable peroxy materials include diacylperoxides and diaroylperoxides, such as lauroyl peroxide, caprylyl peroxide, acetyl peroxide, benzoyl peroxide; chloro diaroyl peroxides, such as 2,4-dichlorobenzoyl peroxide, p-chlorobenzoyl peroxide; dialkyl peroxides, such as di-t-butyl peroxide; diaralkyl peroxides such as dicumyl peroxide; alkylhydroperoxides and cycloalkylhydroperoxides, such as t-butyl hydroperoxide, p-menthane hydroperoxide, pinene hydroperoxide; aralkyl hydroperoxides, such as cumene hydroperoxide; alkyl dihydroperoxides, such as 2,5-dimethylhexane-2,5-dihydroperoxide; alkyl esters of peroxyacids, such as t-butyl peroxyisobutyrate, t-butyl perbenzoate, t-butyl peracetate, di-t-butyl diperphthalate; ketone peroxides, such as methylethyl ketone peroxide, cyclohexanone peroxide; and hydroxyalkyl peroxides, such as hydroxyheptyl peroxide. Other free radical catalysts which may be used as cross-linking agents include azo-diisobutyronitrile, other azo compounds, and the like.

The proportion by weight of the free radical catalyst, e.g., peroxide, used for the cross-linking reaction may be varied in the range of about 0.1 part to twenty parts, and preferably about 0.5 part to about ten parts, based on 100 parts of polyalkylene oxide.

The proportion by weight of sulfur may be varied from about 0.1 part to twenty parts and preferably about 0.2 part to five parts, based on 100 parts of polyalkylene oxide.

The curing time for the compound polyalkylene oxide can be varied from about one minute to twenty hours, with the preferred range being about ten minutes to four hours, depending on the compounding and cure temperature. Cure temperatures in the range between about 70° C. and 370° C., or even broader, may be employed.

VULCANIZING AGENTS (SULFUR TYPE)

Among the suitable sulfur vulcanizing agents are elemental sulfur, hydrogen sulfide, mercaptans such as methanethiol, thiocyclohexane and thiophenol; organic sulfides such as ethylene sulfide, diphenyl sulfide and phenylmethyl sulfide, organic sulfoxide such as di-n-butyl sulfoxide and diphenyl sulfoxide; and heterocyclic compounds such as thiophene, thionaphthalene, thionaphthene and thiophane.

Additionally, organic compounds having more than one reactive mercapto group may be used, such as 1,5-pentanedithiol,
1,4-butanedithiol,
1,4-cyclohexanedithiol,
1,2,4-butanetrithiol,
1,7-dicanedithiol,
3,3'-thiodipropanethiol,
4,4'-thiodihexanethiol,
3,3'-oxydipropanethiol,
4,6-dithio-1,8-decanedithiol,
4,6-disulfonyl-1,8-octanedithiol,
4-hydroxy-1,6-octanedithiol,
1,6-octenedithiol,
hydrogen disulfide,
1,3-benzenedithiol,
1,3,5-benzenetrithiol,
2-chloro-1,5-benzenedithiol,
tetrahydropyran-2,3-dipropanethiol,
4,5-di-hydrofuran-2,5-dibutanethiol,
sulfolane-2,5-dihexanethiol,
furan-2,5-dibutanethiol;
3-hydroxy-dihydropyran-2,4-dioctenethiol, and the like. Additionally, other sulfur-containing rubber vulcanizing compounds may be used such as alkylthiuram sulfides, as for example dimethylthiuram sulfides, tetramethyl thiuram monosulfides, tetramethyl thiuram disulfides, tetramethyl thiuram tetrasulfides, tetramethyl thiuram monosulfide, tetraethyl thiuram disulfide, et cetera. Additionally, thiazoles such as benzothiazole, 2-mercaptobenzothiazole, 2-methylmercaptobenzothiazole, 2-ethylbenzothiazole, 2-benzothiazyl disulfide, and the like, may be used. Of the materials listed above, elemental sulfur is preferred.

The following preparations and examples are given by way of illustration only and are not to be construed as limiting.

*Preparation 1.*—A formulation was prepared as follows:

| | Grams |
|---|---|
| Propylene oxide | 116 |
| Benzene | 112 |
| Zinc-di-n-butyl (1 mole percent) | 3.6 |
| Aluminum triisopropoxide (0.5 mole percent) | 2.04 |
| Water (0.50 mole percent) | 0.09 |

The entire formulation was charged into a dry, nitrogen-flushed one-quart pressure bottle. The bottle was closed with a Mylar (polyethylene terephthalate) lined steel cap and tumbled in a water bath at 70° C. for 48 hours. The solvent was removed from the reaction product by evaporation in vacuo, and 117 grams of a white, rubbery solid were obtained. The polymer exhibited a molecular weight of 2,900,000 (on basis of intrinsic viscosity).

Polypropylene oxides of varying molecular weights were prepared following the above-described general procedure. The preparations are demonstrated in Table I.

TABLE I.—PREPARATION OF POLYPROPYLENE OXIDES OF VARYING MOLECULAR WEIGHT

| Preparation | Mole Percent[1] Zn-di-n-butyl | Mole Percent[1] Al-triisopropoxide | Mole Percent[1] H$_2$O | $\bar{M}_v$ | Yield, Percent |
|---|---|---|---|---|---|
| 2 | 0.5 | 0.5 | 0.5 | 360,000 | 96 |
| 3 | 0.75 | 0.5 | 0.5 | 1,900,000 | 100 |
| 4 | 1.0 | 0.5 | 0.5 | 1,750,000 | 100 |
| 5 | 0.5 | 0.5 | 0.25 | 2,700,000 | 100 |
| 6 | 0.75 | 0.5 | 0.25 | 3,500,000 | 97 |
| 7 | 0.5 | 0.5 | 1.0 | 300,000 | 96 |
| 8 | 1.0 | 1.0 | 1.0 | 200,000 | 100 |
| 9 | 1.0 | 1.0 | 2.0 | 70,000 | 88 |
| 10 | 1.0 | | [2] 2.0 | 150,000 | 80 |

[1] Based on monomer.
[2] Methanol.

*Preparation 11.*—A polymer was prepared utilizing the following materials:

| | Grams |
|---|---|
| Ethylene oxide | 44 |
| Cyclohexane | 66 |
| Zinc-di-n-propyl (0.5 mole percent) | 0.76 |
| Water (0.25 mole percent) | 0.045 |

The entire formulation was processed in the same manner as described in Preparation 1. Forty-four grams of a white, rubbery solid was obtained. The polymer exhibited a molecular weight of 1,500,000 (on basis of intrinsic viscosity).

*Preparation 12.*— A polymer was prepared utilizing the following material:

| | Grams |
|---|---|
| 1,2-butylene oxide | 144 |
| Benzene | 140 |
| Zinc-di-n-butyl (one mole percent) | 3.6 |
| Aluminum isopropoxide (0.5 mole percent) | 2.04 |
| Water (0.5 mole percent) | 0.09 |

The entire formulation was processed in the same manner as described in Preparation 1. One hundred fifteen grams of a white rubbery solid was obtained. The polymer exhibited a molecular weight of 800,000, on basis of intrinsic viscosity using the same intrinsic viscosity-molecular weight relationship as for propylene oxide.

*Preparation 13.*—A polymer was prepared utilizing the following materials:

| | Grams |
|---|---|
| Propylene oxide (75 mole percent) | 87 |
| 1,2-butylene oxide (25 mole percent) | 36 |
| Benzene | 112 |
| Aluminum triisopropoxide (0.5 mole percent) | 2.04 |
| Zinc-di-n-butyl (0.5 mole percent) | 1.8 |
| Water (0.5 mole percent) | .09 |

The general procedure described in Prepartion 1 was followed. A white, rubbery solid was obtained which exhibited a molecular weight of 750,000 based on intrinsic viscosity using the same intrinsic viscosity-molecular weight relationship as for 100 percent propylene oxide.

Example 1–15

The following examples listed in Table II illustrate the vulcanization of polypropylene oxide to yield an elastomer and the physical properties exhibited by these elastomers. In all of the examples, the entire formulation was compounded on a two-roll rubber mill and cured in a heated press for about two hours at a temperature of about 140° C. at a pressure of about 2,000 pounds.

TABLE II.—VULCANIZATION OF POLYPROPYLENE OXIDE

| Example No. | 1 | 2 | 3 | 4 | 5 | 6 | 7 | 8 |
|---|---|---|---|---|---|---|---|---|
| Polypropylene oxide, parts | 100 | 100 | 100 | 100 | 100 | 100 | 100 | 100 |
| $\bar{M}_v$ [1] | 2,900,000 | 2,800,000 | 3,100,000 | 2,800,000 | 7,000,000 | 1,850,000 | 8,000,000 | 8,000,000 |
| Zinc oxide, parts | 5 | 5 | | | 5 | 5 | 5 | 5 |
| Triisopropanolamine, parts | 1 | | | | 1 | 1 | 1 | 1 |
| Stearic acid, parts | | 2 | | | | | | |
| Dicumylperoxide, parts | 4 | 4 | 4 | 4 | 4 | 4 | 4 | 4 |
| Agerite Alba stabilizer,[2] parts | 2 | 2 | 2 | 2 | 2 | 2 | 2 | 2 |
| Thermax carbon black,[3] parts | 15 | 15 | 5 | 70 | 15 | 15 | 15 | 15 |
| Sulfur, parts | 2 | 2 | 0.37 | 0.37 | 2 | 2 | 2 | 2 |
| Cure time, hours | 2 | 2 | (4) | (4) | 2 | 2 | 2 | 2 |
| Cure temperature, °C | 140 | 140 | 163 | 163 | 140 | 140 | 140 | 140 |
| Tensile strength, p.s.i | 2,124 | 1,910 | 1,695 | 1,537 | 1,995 | 1,964 | 2,065 | 1,920 |
| 300% modulus, p.s.i | 578 | 406 | 410 | 590 | 714 | 539 | 552 | 573 |
| 100% modulus, p.s.i | 281 | 217 | 203 | 271 | 252 | 278 | 263 | 272 |
| Elongation, percent | 570 | 620 | 537 | 550 | 497 | 555 | 540 | 530 |
| Shore A hardness | 48 | 48 | 50 | 58 | 48 | 60 | 58 | 58 |

| Example No. | 9 | 10 | 11 | 12 | 13 | 14 | 15 |
|---|---|---|---|---|---|---|---|
| Polypropylene oxide, parts | 100 | 100 | 100 | 100 | 100 | 100 | 100 |
| $\bar{M}_v$ [1] | 1,600,000 | 1,500,000 | 1,500,000 | 1,500,000 | 1,500,000 | 1,000,000 | 2,900,000 |
| Zinc oxide, parts | 5 | 5 | 5 | 5 | 5 | 5 | 5 |
| Triisopropanolamine, parts | 1.5 | 1 | 1 | 1 | 1 | 1 | 1 |
| Stearic acid, parts | | | | | | | |
| Dicumylperoxide, parts | 4 | 4 | 4 | 4 | 4 | 4 | 4 |
| Agerite Alba stabilizer,[2] parts | 2 | 2 | 2 | [5] 2 | [5] 2 | 2 | 2 |
| Thermax carbon black,[3] parts | 15 | 15 | 50 | 15 | 50 | 15 | 15 |
| Sulfur, parts | 2 | 2 | 2 | 2 | 2 | 2 | 2 |
| Cure time, hours | 2 | 2 | 2 | 2 | 2 | 2 | 2 |
| Cure temperature, °C | 140 | 140 | 140 | 140 | 140 | 140 | 140 |
| Tensile strength, p.s.i | 2,090 | 2,145 | 1,996 | 1,748 | 1,675 | 1,809 | 2,124 |
| 300% modulus, p.s.i | 545 | 418 | 452 | 433 | 468 | 348 | 573 |
| 100% modulus, p.s.i | 260 | 221 | 237 | 215 | 233 | 177 | 281 |
| Elongation, percent | 520 | 667 | 623 | 583 | 563 | 680 | 570 |
| Shore A hardness | 58 | 57 | 56 | 58 | 57 | 53 | 58 |

[1] As determined immediately after polymerization.
[2] Hydroquinone monobenzyl ether.
[3] Medium thermal carbon balck.
[4] 20 minutes.
[5] Agerite Resin (Aldo-α-naphthylamine).

In the same manner, all of the polypropylene oxides set forth in Table I are vulcanized in the manner and according to the procedure of Examples 1–15 with production of a correspondingly superior vulcanized elastomeric product.

*Examples 16–18*

Table III illustrates the vulcanization of the polyalkylene oxides prepared in the manner set forth in Preparations 11–13 above.

TABLE III

| | Example No. | | |
|---|---|---|---|
| | 16 | 17 | 18 |
| Polyalkylene oxide, 100 parts | Preparation 11 | Preparation 12 | Preparation 13 |
| $\bar{M}_v$ [1] | 1,500,000 | 800,000 | 750,000 |
| Zinc oxide, parts | 5 | 5 | 5 |
| Triisopropanolamine, parts | 1 | 1 | 1 |
| Dicumylperoxide, parts | 4 | 4 | 4 |
| Agerite Alba stabilizer,[2] parts | 2 | 2 | 2 |
| Thermax carbon black,[3] parts | 15 | 15 | 15 |
| Sulfur, parts | 2 | 2 | 2 |
| Cure time, hrs | 2 | 2 | 2 |
| Cure temperature, °C | 140 | 140 | 140 |
| Tensile strength, p.s.i | 2,510 | 1,530 | 1,542 |
| 300% modulus, p.s.i | 820 | 320 | 419 |
| 100% modulus, p.s.i | 460 | 180 | 289 |
| Elongation, percent | 480 | 840 | 493 |
| Shore A hardness | 71 | 43 | 54 |

[1] As determined immediately after polymerization.
[2] Hydroquinone monobenzyl ether.
[3] Medium thermal carbon black.

Example 19 (Comparative example)

In order to determine whether the presence of a peroxide (or other free radical catalyst) is required for cross-linking the polyalkylene oxide in order to provide a suitable elastomer, the following formulation was prepared, a peroxide catalyst being omitted:

| | Parts |
|---|---|
| Polypropylene oxide ($\overline{M}_v$ 240,000) | 100 |
| Raven 15 carbon black (channel carbon black, EPC type) | 50 |
| Stearic acid | 2 |
| Zinc oxide | 5 |
| Sulfur | 2 |
| Agerite Alba stabilizer (hydroquinone monobenzyl ether) | 2 |
| Altax (benzothiazyl disulfide) | 2 |
| UNADS (tetramethylthiuram monosulfide) | 1 |

The formulation was compounded on a two-roll rubber mill and press-cured at 140° C. for one hour. A tacky, dough-like material was obtained which was unsuitable for use as an elastomer.

Example 20 (Comparative example)

To illustrate the importance of the presence of a sulfur vulcanizing agent to achieve cross-linking of the compounded polypropylene oxide, the sulfur was omitted in this case:

| | Parts |
|---|---|
| Polypropylene oxide | 100 |
| Zinc oxide | 5 |
| Dicumylperoxide | 4 |
| Agerite Alba stabilizer (hydroquinone monobenzyl ether) | 2 |
| Triisopropanolamine | 1 |
| Thermax carbon black (thermal type carbon black) | 15 |

The above formulation was compounded on a two-roll rubber mill and press-cured at 140° C. for two hours. No cure was obtained.

Example 21 (Comparative example)

To show the advantage gained in cross-linking and filling the polypropylene oxide, the physical properties of an uncross-linked, unfilled polypropylene oxide (a), a cross-linked, unfilled polypropylene oxide (b) and a cross-linked, filled polypropylene oxide (c) were determined and are shown below:

(a):
Polypropylene oxide ($\overline{M}_v$ 540,000–2,500,000) shows tensile strength from 200 to 600 p.s.i.

(b):

| | Parts |
|---|---|
| Polypropylene oxide ($\overline{M}_v$ 1,540,000) | 100 |
| Zinc oxide | 5 |
| Stearic acid | 2 |
| Sulfur | 2 |
| Dicumylperoxide | 4 |
| Agerite Alba stabilizer (hydroquinone monobenzyl ether) | 2 |

The formulation was compounded on a two-roll rubber mill and press-cured at 140° C. for two hours and exhibited the following physical properties:

| | | |
|---|---|---|
| Tensile strength | p.s.i. | 1524 |
| 100% modulus | p.s.i. | 180 |
| 300% modulus | p.s.i. | 480 |
| Elongation | percent | 650 |
| Shore A hardness | | 50 |

(c):

| | Parts |
|---|---|
| Polypropylene oxide ($\overline{M}_v$ 1,500,000) | 100 |
| Thermax carbon black (medium thermal carbon black) | 15 |
| Zinc oxide | 5 |
| Stearic acid | 2 |
| Sulfur | 2 |
| Dicumylperoxide | 4 |
| Agerite Alba stabilizer (hydroquinone monobenzyl ether) | 2 |

The formulation was compounded on a two-roll rubber mill and press-cured for two hours at 140° C. The following physical properties were obtained:

| | | |
|---|---|---|
| Tensile strength | p.s.i. | 1980 |
| 100% modulus | p.s.i. | 270 |
| 300% modulus | p.s.i. | 575 |
| Elongation | percent | 582 |
| Shore A hardness | | 57 |

From the foregoing it is obvious that for a suitable cross-linked or vulcanized polyalkylene oxide elastomer both free radical and sulfur-containing vulcanizing agents must be employed and that filling of the thus cross-linked or vulcanized polymer still further enhances its desirable characteristics.

It is to be understood that the invention is not to be limited to the exact details or operation or exact compounds and compositions shown and described, as obvious modifications and equivalents will be apparent to one skilled in the art, and the invention is therefore to be limited only by the scope of the appended claims.

We claim:

1. An elastomer comprising the reaction product produced by mixing together and reacting a polymer of an alkylene oxide free of other than aromatic unsaturation having two to twelve carbon atoms inclusive with a free radical vulcanizing agent and a sulfur-containing vulcanizing agent.

2. An elastomer according to claim 1 wherein said polymer has a molecular weight of about 100,000 to about 20,000,000.

3. An elastomer according to claim 1 wherein said polymer has a molecular weight of about 1,000,000 to about 10,000,000.

4. An elastomer according to claim 1 wherein said alkylene oxide is ethylene oxide.

5. An elastomer according to claim 1 wherein said alkylene oxide is propylene oxide.

6. An elastomer according to claim 1 wherein said alkylene oxide is 1,2-butylene oxide.

7. An elastomer according to claim 1 wherein said alkylene oxide comprises a mixture of two different alkylene oxides.

8. An elastomer according to claim 1 wherein said free radical vulcanizing agent is an organic peroxide.

9. An elastomer according to claim 1 wherein said free radical vulcanizing agent is dicumyl peroxide.

10. An elastomer according to claim 1 wherein said sulfur-containing vulcanizing agent is sulfur.

11. An elastomer according to claim 1 wherein said free radical vulcanizing agent is dicumyl peroxide and said sulfur-containing vulcanizing agent is sulfur.

12. An elastomer according to claim 1 wherein said alkylene oxide is propylene oxide, said free radical vulcanizing agent is dicumyl peroxide and said sulfur-containing vulcanizing agent is sulfur.

13. A process for the preparation of an elastomer which comprises mixing together and reacting a polymer of an alkylene oxide free of other than aromatic unsaturation having two to twelve carbon atoms inclusive, with a free radical vulcanizing agent and a sulfur-containing vulcanizing agent.

14. A method according to claim 13 wherein said polymer has a molecular weight of about 100,000 to about 20,000,000.

15. A method according to claim 13 wherein said polymer has a molecular weight of about 1,000,000 to about 10,000,000.

16. A method according to claim 13 wherein said alkylene oxide is ethylene oxide.

17. A method according to claim 13 wherein said alkylene oxide is propylene oxide.

18. A method according to claim 13 wherein said alkylene oxide is 1,2-butylene oxide.

19. A method according to claim 13 wherein said alkylene oxide comprises a mixture of two different alkylene oxides.

20. A method according to claim 13 wherein said free radical vulcanizing agent is an organic peroxide.

21. A method according to claim 13 wherein said free radical vulcanizing agent is dicumylperoxide.

22. A method according to claim 13 wherein said sulfur-containing vulcanizing agent is sulfur.

23. A method according to claim 13 wherein said free radical vulcanizing agent is dicumylperoxide and said sulfur-containing vulcanizing agent is sulfur.

24. A method according to claim 13 wherein said alkylene oxide is propylene oxide, said free radical vulcanizing agent is dicumylperoxide and said sulfur-containing vulcanizing agent is sulfur.

References Cited

UNITED STATES PATENTS 3,258,447   6/1966   Matteucci et al. _____ 260—79.5

FOREIGN PATENTS 626,803    1/1963   Belgium.
1,111,379  2/1962   Germany.

JOSEPH L. SCHOFER, *Primary Examiner.*

D. K. DENENBERG, *Assistant Examiner.*